United States Patent
Son et al.

(10) Patent No.: US 9,634,501 B2
(45) Date of Patent: Apr. 25, 2017

(54) PROTECTIVE CIRCUIT OF UNIT CELL

(71) Applicant: VITZROCELL CO. LTD., Chungcheongnam-do (KR)

(72) Inventors: Jun-Ho Son, Cheonan-si (KR); Hye-Won Shin, Chungcheongnam-do (KR); Yong-Hyun Lee, Gimcheon-si (KR); Kwang-Il Chung, Suncheon-si (KR); Bum-Soo Kim, Cheonan-si (KR)

(73) Assignee: VITZROCELL CO. LTD., Chungcheongnam-Do (KR)

( * ) Notice: Subject to any disclaimer, the term of this patent is extended or adjusted under 35 U.S.C. 154(b) by 291 days.

(21) Appl. No.: 14/444,388

(22) Filed: Jul. 28, 2014

(65) Prior Publication Data

US 2016/0028258 A1    Jan. 28, 2016

(30) Foreign Application Priority Data

Jul. 23, 2014  (KR) .................. 10-2014-0093485

(51) Int. Cl.
  *H02J 7/00*     (2006.01)
  *H02H 3/24*     (2006.01)

(52) U.S. Cl.
  CPC ........... *H02J 7/0031* (2013.01); *H02H 3/243* (2013.01); *H02J 2007/004* (2013.01)

(58) Field of Classification Search
  CPC ....... H02J 7/0029; H02J 7/0031; H02H 3/243
  USPC .................................. 320/134, 136
  See application file for complete search history.

(56) References Cited

U.S. PATENT DOCUMENTS

| | | | |
|---|---|---|---|
| 5,477,124 A | 12/1995 | Tamai | |
| 5,856,738 A * | 1/1999 | Yoshimatsu | H01M 6/50 320/136 |
| 6,097,177 A | 8/2000 | Sudo et al. | |

FOREIGN PATENT DOCUMENTS

| | | |
|---|---|---|
| KR | 10-1993-0011370 A | 6/1993 |
| KR | 10-2010-0097339 A | 9/2010 |
| KR | 20100097339 A * | 9/2010 |

OTHER PUBLICATIONS

Machine Translation of Korean Publication KR20100097339A.*

(Continued)

*Primary Examiner* — Richard Isla Rodas
*Assistant Examiner* — David V Henze-Gongola
(74) *Attorney, Agent, or Firm* — Hauptman Ham, LLP

(57) ABSTRACT

The protective circuit includes a voltage dividing circuit connected in parallel between a first electrode and a second electrode of the unit cell and including a first voltage dividing resistor and a second voltage dividing resistor; a first switching device connected to a junction between the first voltage dividing resistor and the second voltage dividing resistor; a second switching device connected between the junction and the third switching device; and a fourth switching device connected between the junction and the third switching device, wherein, when output voltage of the unit cell becomes equal to or lower than a first reference voltage, the fourth switching device and the first switching device are sequentially turned off, the second switching device is turned on, and the third switching device is turned off, so that voltage output through the first output terminal can be cut off.

3 Claims, 2 Drawing Sheets

(56) References Cited

OTHER PUBLICATIONS

Korean Office Action dated Nov. 12, 2015 in connection with the counterpart Korean Patent Application No. 10-2014-0093485.
European Extended Search Report corresponding to Application No. 14178783.8-1804 issued on Dec. 8, 2015.

* cited by examiner

PROTECTIVE CIRCUIT OF UNIT CELL

CROSS REFERENCE TO RELATED APPLICATION

This application claims the benefit of Korean Patent Application No. 10-2014-0093485, filed on Jul. 23, 2014, entitled "PROTECTIVE CIRCUIT OF UNIT CELL", which is hereby incorporated by reference in its entirety into this application.

BACKGROUND

1. Technical Field

The present invention relates to a protective circuit of a unit cell.

2. Description of the Related Art

Lithium batteries have recently entered widespread use as a power source for industrial machines or household appliances due to advantageously high voltage, broad operating temperature range, long-term stability and high energy thereof, as compared to other cells. Such a lithium battery includes a plurality of unit cells according to optimum current and maximum current conditions. Here, an assembly of the plural unit cells is referred to as a battery pack.

The lithium battery has an allowable voltage of, for example, 3.6V to 2.0V in consideration of efficiency and safety, and a reference voltage of, for example, 2.0V is called cut-off voltage. When the battery is continuously used at a voltage lower than the cut-off voltage, internal resistance of the battery increases, causing a voltage drop. Such continuous use of the battery at voltage lower than the cut-off voltage is called over-discharge. Continued over-discharge can cause internal short circuit of unit cells, which leads to explosion of the battery. Therefore, it is necessary to avoid over-discharge of the unit cells.

FIG. 1 is a graph depicting a voltage curve when a general unit cell is connected to a load and discharged. Before connection to the load, the unit cell has an open circuit voltage (OCV) of about 3.6V. However, when the unit cell is connected to the load, the output voltage of the unit cell temporarily drops to a transition minimum voltage (TMV) as shown in Section a of FIG. 1, and then returns to a normal closed circuit voltage (CCV). Thereafter, the output voltage of the unit cell gradually drops through a discharge section, as shown in Section b. When the output voltage of the unit cell reaches the cut-off voltage, internal resistance of the cell increases, thereby causing over-discharge, as shown in Section c, in which the output voltage of the unit cell rapidly drops.

Conventionally, a protective circuit has been used in a state of being connected to the unit cell so as to cut off operation of the unit cell during the over discharge section of the unit cell. However, such a conventional protective circuit has a problem that micro-discharge continues even when the unit cell is cut off due to over-discharge, since a predetermined period of time is taken until discharge of the unit cell is completely cut off.

In addition, the conventional protective circuit has a problem that a resetting procedure is additionally required, since recovery of OCV is not recognized even though the unit cell recovers OCV from over-discharge cut-off.

BRIEF SUMMARY

It is an aspect of the present invention to provide a protective circuit of a unit cell which can drastically reduce time taken until over-discharge cut-off is completely achieved after cut-off is started for the unit cell.

It is another aspect of the present invention to provide a protective circuit of a unit cell which has a reset function to automatically release cut-off without any additional procedure when the unit cell recovers an open circuit voltage from over-discharge cut-off.

The present invention is not limited to these aspects, and other aspects and advantages of the present invention not mentioned above will be understood through the following description, and more clearly understood from exemplary embodiments of the present invention. In addition, it will be easily appreciated that the aspects and advantages are realized by features and combination thereof as set forth in claims.

In accordance with one aspect of the present invention, a protective circuit of a unit cell includes: a voltage dividing circuit connected in parallel between a first electrode and a second electrode of the unit cell and including a first voltage dividing resistor and a second voltage dividing resistor; a first switching device connected to a junction between the first voltage dividing resistor and the second voltage dividing resistor; a second switching device connected between the junction and the third switching device; and a fourth switching device connected between the junction and the third switching device, wherein, when output voltage of the unit cell becomes equal to or lower than a first reference voltage, the fourth switching device and the first switching device are sequentially turned off, the second switching device is turned on, and the third switching device is turned off, so that voltage output through the first output terminal can be cut off.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
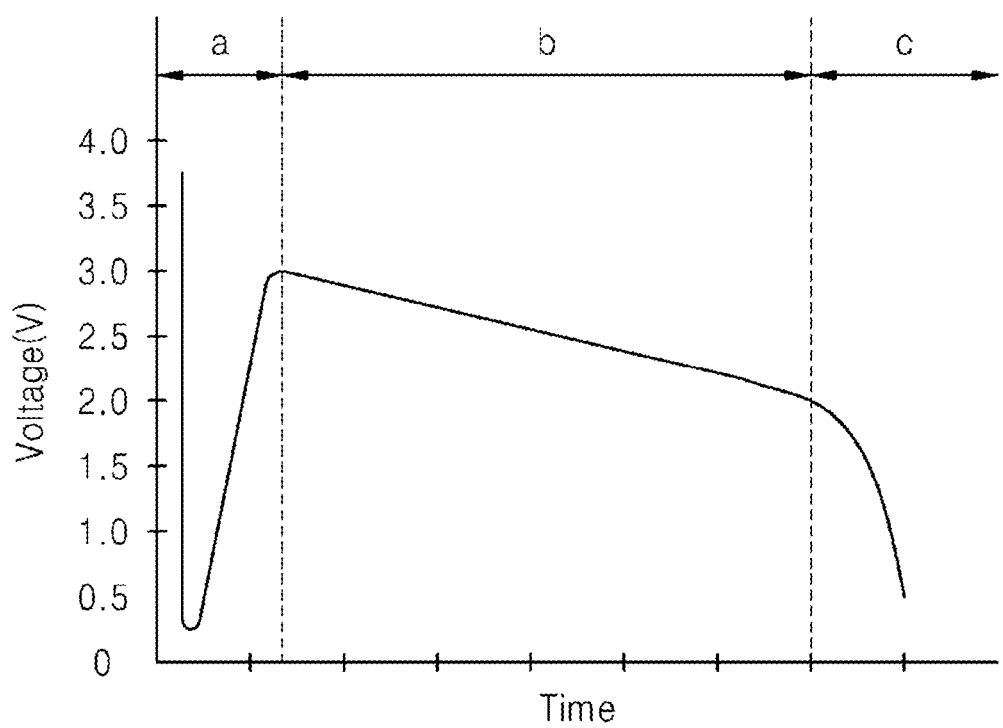
FIG. 1 is a graph depicting a voltage curve when a general unit cell is connected to a load and discharged.

The foregoing aspects, features and merits will be described in detail with reference to the accompanying drawings, and thus the present invention can be readily embodied by a person having ordinary knowledge in the art. Detailed descriptions of components and functions related to the present invention and apparent to those skilled in the art will be omitted for clarity. Next, embodiments of the present invention will be described in detail with reference to the accompanying drawings. Like components will be denoted by like reference numerals throughout the drawings.

Figure 2:
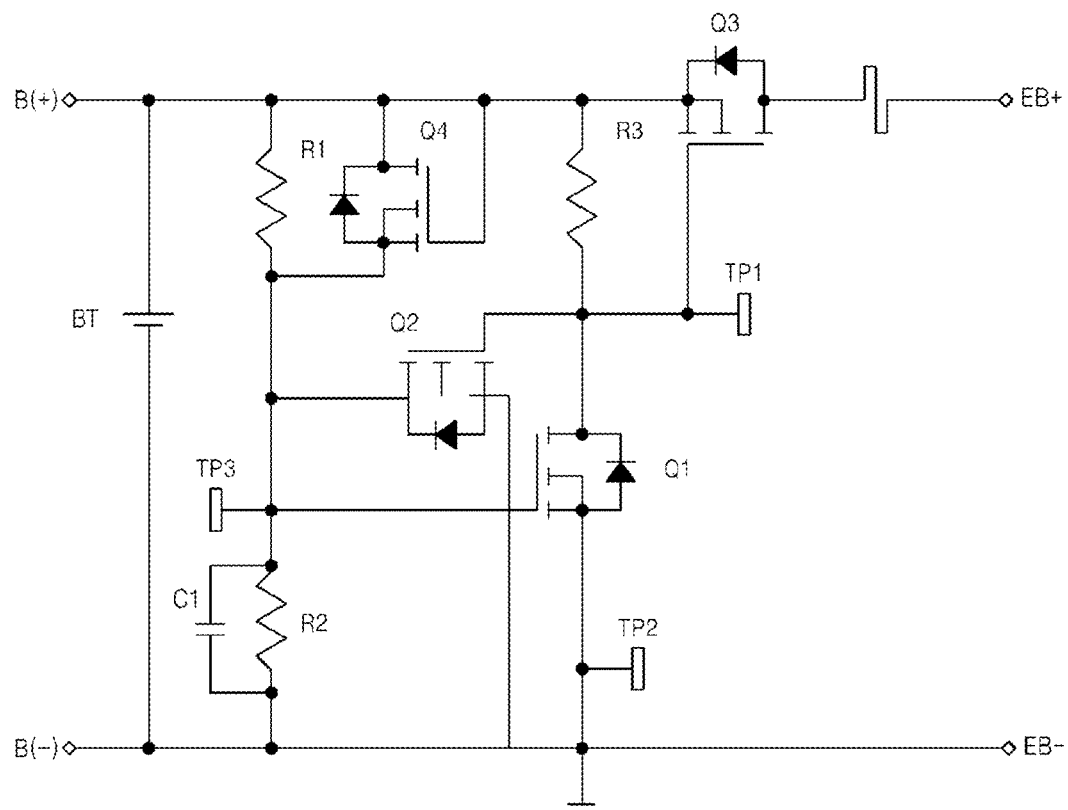
FIG. 2 is a circuit diagram of a protective circuit of a unit cell according to one embodiment of the present invention.

FIG. 2 is a circuit diagram of a protective circuit of a unit cell according to one embodiment of the present invention.

Referring to FIG. 2, a first electrode and a second electrode of a unit cell BT are connected to a protective circuit and connected to a load through a first output terminal EB+ and a second output terminal EB−. In this embodiment, the first electrode and the second electrode are a cathode and an anode, respectively, but the present invention is not limited thereto. In another embodiment of the present invention, the first electrode may be an anode and the second electrode may be a cathode. In this case, the first output terminal may be EB− and the second output terminal may be EB+.

Both terminals of the unit cell BT are connected in parallel to a voltage dividing circuit including a first voltage dividing resistor R1 and a second voltage dividing resistor R2, as shown in FIG. 2. In FIG. 2, a point to which the first voltage dividing resistor R1 and the second voltage dividing resistor R2 are connected is defined as a "junction."

A first switching device Q1 is connected between the first electrode and the second electrode of the unit cell (or between the first output terminal EB+ and the second output terminal EB−). The first switching device Q1 has a gate connected to the junction between the first voltage dividing resistor R1 and the second voltage dividing resistor R2.

A third switching device Q3 is connected between the first electrode and the first output terminal EB+ of the unit cell. As shown in FIG. 2, a third voltage dividing resistor R3 may be connected between the first switching device Q1 and the third switching device Q3.

A fourth switching device Q4 is connected between the first electrode and the third switching device Q3 of the unit cell. Further, a second switching device Q2 is connected to the third switching device Q3 and between the junction of the first voltage dividing resistor R1 and the second voltage dividing resistor R2.

In addition, the protective circuit of FIG. 2 includes a first capacitor C1 connected in parallel to the second voltage dividing resistor R2. As described with reference to FIG. 1, output voltage of the unit cell connected to a load temporarily drops to TMV (see Section a of FIG. 1). In an open circuit, that is, under conditions that the load is not connected to the unit cell, voltage of the unit cell BT is applied to the first capacitor C1 to charge the first capacitor C1. Then, when the load is connected to the unit cell BT, the voltage charged in the first capacitor C1 during an initial-voltage delay time as shown in Section a of FIG. 1 is output through the first output terminal EB+ and the second output terminal EB−, thereby preventing over-discharge cut-off of the protective circuit from being immediately performed upon connection to the load. When entering a normal discharge section as shown in Section b of FIG. 1 after the initial-voltage delay time elapses, voltage is normally supplied by the unit cell BT instead of the first capacitor C1.

Next, the over-discharge cut-off and reset operations of the protective circuit according to the present invention will be described with reference to FIG. 2.

First, the over-discharge cut-off operation of the protective circuit according to the present invention will be described. When the unit cell BT is connected to a load in a completely charged state, for example, while maintaining an open circuit voltage of 3.6V, the fourth switching device Q4 is turned on since a voltage higher than a threshold voltage is applied to the fourth switching device Q4. Thus, a voltage at the junction, i.e. V(TP3), is equal to the voltage of the unit cell, i.e. V(BT). Accordingly, the voltage higher than the threshold voltage is applied to the first switching device Q1 connected to the junction, and thus the first switching device Q1 is turned on. Then, TP1 is grounded and the third switching device Q3 is kept tuned on. Therefore, the voltage of the unit cell BT is directly output through the first output terminal EB+.

While such a normal discharging procedure is performed, the output voltage V(BT) of the unit cell BT is gradually decreased. When V(BT) is equal to or lower than a first reference voltage (for example, a cut-off voltage or 2.0V), the voltage applied to the fourth switching device Q4 also becomes lower than the threshold voltage, thereby turning off the fourth switching device Q4. As the fourth switching device Q4 is turned off, the voltage V(TP3) at the junction is further lowered below V(BT). In one embodiment of the present invention, Equation "V(TP3)=(⅗)×V(BT)" may be established, and the first voltage dividing resistor R1 and the second voltage dividing resistor R2 may be set to satisfy this equation.

Due to drop of V(BT), when V(TP3) is lowered, a voltage lower than the threshold voltage is applied to the first switching device Q1 and thus a channel of the first switching device Q1 is gradually closed. At this time, since V(TP1)≈V(BT), the second switching device Q2 is turned on and V(TP3)=0. In this way, as V(TP3) becomes 0, the first switching device Q1 is completely turned off. When the first switching device Q1 is turned off, the voltage at TP1, i.e. V(TP1), is equal to V(BT), whereby voltage lower than the threshold voltage is applied to the third switching device Q3, thereby turning off the third switching device Q3. As the third switching device Q3 is turned off, the voltage output to the load through the first output terminal EB+ and the second output terminal EB− is completely cut off.

Next, the reset operation of the protective circuit according to the present invention will be described. When over-discharge cut-off is performed as described above, an output voltage V(BT) of the unit cell BT is equal to or lower than a first reference voltage of, for example, 2.0V. In this state, the unit cell BT is charged with electric power supplied from an external power source, whereby the unit cell BT can recover an output voltage higher than a second reference voltage of, for example, OCV or 3.6V.

In this way, V(TP3)≈V(BT) while V(BT) rises up to the second reference voltage, and V(TP1) drops to 0V as a channel is gradually formed in the first switching device Q1. Eventually, when V(TP1) becomes 0, the second switching device Q2 is turned off. When V(BT) rises equal to or higher than the second reference voltage, the voltage applied to the fourth switching device Q4 again becomes higher than the threshold voltage, and the fourth switching device Q4 is turned on. Thus, if the second switching device Q2 is turned off and the fourth switching device Q4 is turned on, the voltage V(TP3) at the junction is kept equal to V(BT). Therefore, the voltage equal to V(BT) is applied to the first switching device Q1, and thus the first switching device Q1 is turned on. When the first switching device Q1 is turned on, TP1 is grounded, and thus the third switching device Q3 is turned on. As the third switching device Q3 is turned on, the first output terminal EB+ outputs the voltage from the unit cell BT to the load.

As such, when the voltage of the unit cell BT satisfies OCV or the second reference voltage through charging in a state that over-discharge cut-off is performed to cut off voltage output through the first output terminal and the second output terminal, voltage supply is automatically resumed without any additional resetting procedure.

In the foregoing operations of the protective circuit to cut off over-discharge and perform resetting, the second switching device Q2 allows the voltage at TP1, i.e. V(TP1), to have only one of 0V and 3.6V, thereby enabling more accurate and rapid cut-off and reset operations.

As described above, according to the present invention, it is possible to drastically reduce time taken until over-discharge cut-off is completely achieved after cut-off is started for the unit cell.

Further, it is advantageously possible to provide a reset function of automatically releasing cut-off without any additional procedure when the unit cell recovers an open circuit voltage from over-discharge cut-off.

Although some embodiments have been described herein, it should be understood that various modifications, changes, alterations, and equivalent embodiments can be made by those skilled in the art without departing from the spirit and scope of the invention. Therefore, the scope of the invention should be limited only by the accompanying claims and equivalents thereof.

What is claimed is:

1. A protective circuit of a unit cell, comprising:
 a voltage dividing circuit connected in parallel between a first electrode and a second electrode of the unit cell and comprising a first voltage dividing resistor and a second voltage dividing resistor;
 a first switching device connected to a junction between the first voltage dividing resistor and the second voltage dividing resistor;
 a third switching device connected between the first electrode and a first output terminal;
 a second switching device connected between the junction and the third switching device; and
 a fourth switching device connected between the junction and the third switching device, wherein,
 when output voltage of the unit cell becomes equal to or lower than a first reference voltage, the fourth switching device and the first switching device are sequentially turned off, the second switching device is turned on, and the third switching device is turned off, so that voltage output through the first output terminal can be cut off, and
 when the output voltage of the unit cell is equal to or lower than a second reference voltage, the fourth switching device and the first switching device are sequentially turned on, the second switching device is turned off, and the third switching device is turned on.

2. The protective circuit of the unit cell according to claim 1, further comprising: a first capacitor connected in parallel to the second voltage dividing resistor.

3. The protective circuit of the unit cell according to claim 1, further comprising: a third voltage dividing resistor connected between the first switching device and the first output terminal.

* * * * *